(12) United States Patent
Wen et al.

(10) Patent No.: US 9,772,188 B2
(45) Date of Patent: *Sep. 26, 2017

(54) FREQUENCY BASED RING LASER SENSOR

(71) Applicant: SHENZHEN UNIVERSITY, Shenzhen (CN)

(72) Inventors: Qiao Wen, Shenzhen (CN); Guowen Liang, Shenzhen (CN); Ji Li, Shenzhen (CN); Hanben Niu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,059

(22) Filed: Apr. 27, 2016

(65) Prior Publication Data

US 2016/0238392 A1 Aug. 18, 2016

Related U.S. Application Data

(63) Continuation-in-part of application No. PCT/CN2015/072691, filed on Feb. 10, 2015.

(51) Int. Cl.
*G01C 19/66* (2006.01)
*H01S 3/067* (2006.01)

(52) U.S. Cl.
CPC ........ *G01C 19/661* (2013.01); *H01S 3/06791* (2013.01)

(58) Field of Classification Search
CPC .... G01C 19/64; G01C 19/667; G01C 19/668; G01C 19/68; G01C 19/70; G01C 19/661; G01C 19/66

See application file for complete search history.

(56) References Cited

U.S. PATENT DOCUMENTS

| | | | | |
|---|---|---|---|---|
| 3,741,657 A | * | 6/1973 | Andringa | G01C 19/667 356/467 |
| 4,120,587 A | * | 10/1978 | Vali | G01C 19/66 356/461 |
| 4,429,997 A | * | 2/1984 | Matthews | G01C 19/667 356/467 |

(Continued)

FOREIGN PATENT DOCUMENTS

CN 1828309 9/2006
CN 202267808 6/2012

(Continued)

*Primary Examiner* — Michael P Lapage
(74) *Attorney, Agent, or Firm* — Hamre, Schumann, Mueller & Larson, P.C.

(57) ABSTRACT

A frequency based ring laser sensor is disclosed. The sensor includes a pump source, a common section, and a reference section and a detection section. The common section is provided with a gain medium. The common section and the reference section form a first ring laser resonator, and the common section and the detection section form a second ring laser resonator. Laser beams are transmitted oppositely in the first ring laser resonator and the second ring laser resonator. The detection section is provided with a sensing element capable of causing an optical path difference. The common section is provided with an output unit or each of the reference section and the detection is provided with the output unit, and the output unit is connected to a photoelectric detector through a light uniting unit.

10 Claims, 3 Drawing Sheets

(56) References Cited

U.S. PATENT DOCUMENTS

| | | | | |
|---|---|---|---|---|
| 4,521,110 A | * | 6/1985 | Roberts | G01C 19/66 |
| | | | | 356/459 |
| 4,556,319 A | | 12/1985 | Gauert et al. | |
| 4,647,204 A | * | 3/1987 | Honeycutt | G01C 19/66 |
| | | | | 356/459 |
| 4,718,766 A | * | 1/1988 | Greenstein | G01C 19/66 |
| | | | | 356/472 |
| 5,398,256 A | * | 3/1995 | Hohimer | H01S 5/1071 |
| | | | | 372/46.01 |

FOREIGN PATENT DOCUMENTS

| | | |
|---|---|---|
| CN | 104634369 | 5/2015 |
| CN | 104655159 | 5/2015 |
| JP | 2005241298 | 9/2005 |

\* cited by examiner

FREQUENCY BASED RING LASER SENSOR

The invention belongs to the technical field of optical sensing, in particular to a ring laser sensor.

BACKGROUND

In the existing technology, small changes in physical quantities such as length, temperature, refractive index, pressure and so on are usually measured through the optical fiber sensor. A Mach-Zehnder interferometer based optical sensor is a common optical fiber sensor. The measuring principle comprises dividing the laser beam output by the laser into two beams which respectively pass the couplers and come into the two optical fiber arms of the interferometer; uniting the two beams transmitted in the two arms by the couplers to form interference; detecting the light intensity of the interference of the two beams by a detector to determine a phase difference; and determining the measured physical quantity. Because the amounts of optical paths of the two arms can be affected by external conditions such as temperature, pressure and so on, the Mach-Zehnder interferometer can finish the measurement of physical quantities such as optical fiber strain and temperature, and is the important physical basis of many sensors. But such optical fiber sensor detects the phase difference of two beams of laser, the detection precision and sensitivity is still limited and it needs to provide a new type optical sensor of high precision and high sensitivity.

SUMMARY

The present invention aims at providing a ring laser sensor, to improve the measurement precision and sensitivity.

The present invention is implemented by a ring laser sensor comprising a pump source, a common section, and a reference section and a detection section which are connected to the two ends of the common section in parallel, the common section is provided with a gain medium, the common section and the reference section form a first ring laser resonator, and the common section and the detection section form a second ring laser resonator, lasers are transmitted oppositely in the first ring laser resonator and the second ring laser resonator, the detection section is provided with a sensing element capable of causing an optical path difference; the common section is provided with an output unit or each of the reference section and the detection section is provided with the output unit, the output unit is connected to a photoelectric detector through a light uniting unit, the lasers are output from the output unit, and are united and transmitted to the photoelectric detector.

The sensor of the present invention comprises two ring laser resonators with opposite transmission directions, the detection section is provided with the sensing element capable of causing an optical path difference; sensing the physical quantities by the sensing element leads to the change of the optical path and the frequency of the laser transmitted in the detection section, thereby generating a frequency difference between two lasers, and a heterodyne interference is generated by the two lasers with different frequencies, the amounts of physical quantities are determined by detecting the frequency difference; and because the frequencies of the laser oscillations are sensitive to the changes of the optical paths in the resonators, the sensitivity and accuracy of the sensor are much higher than the traditional sensor based on the phase difference; and the two resonators of the sensor have common optical path, the changes of the common section caused by the external environment lead to basically the same frequency changes for the first ring laser and the second ring laser, therefore the detection of the frequency difference can offset such changes, such that the sensor has good anti jamming capacity and is suitable for measuring the small changes in a variety of physical quantities.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiment described herein is merely used to explain the present invention but is not used to limit the present invention to it.

Figure 1:
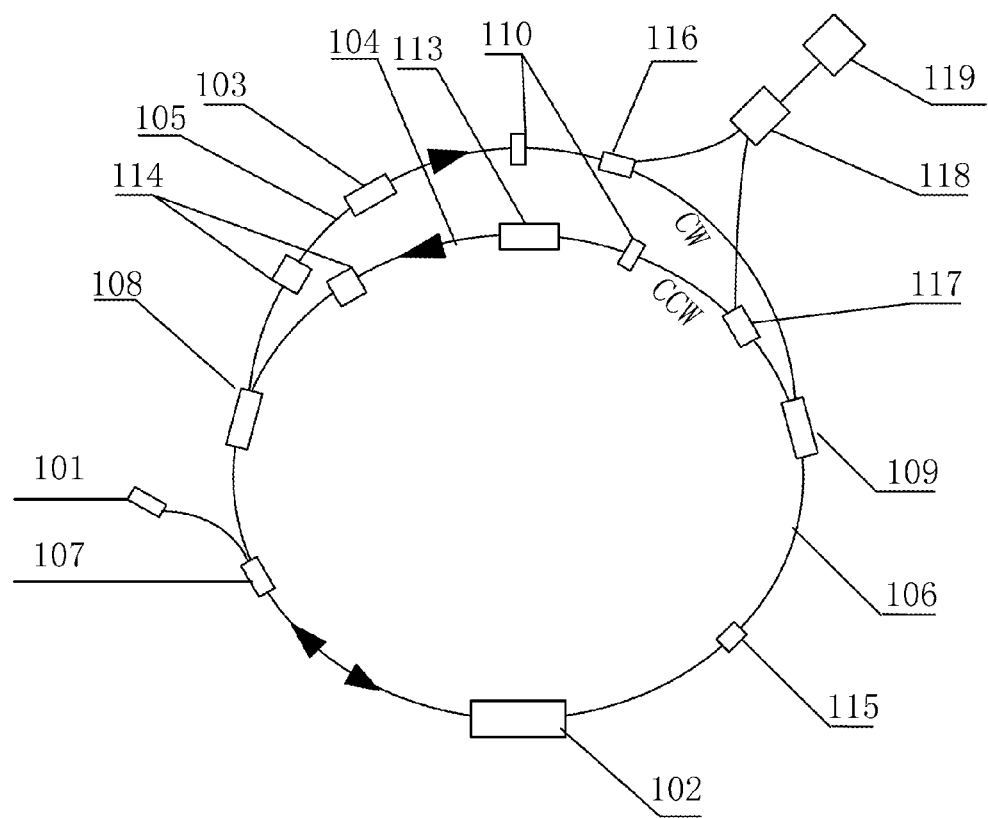
FIG. 1 is a first schematic structure view of the ring laser sensor according to the first embodiment of the present invention.

The following specific examples of the specific implementation of the invention are described in detail:

Referring to FIG. 1, the embodiment of the present invention provides a ring laser sensor comprising a pump source 101, a common section, and a reference section and a detection section which are connected to the two ends of the common section in parallel, wherein the common section is provided with a gain medium 102, the common section and the reference section form a first ring laser resonator shown as the counterclockwise transmission resonator in FIG. 1 (referred to counterclockwise resonator hereafter), the common section and the detection section form a second ring laser resonator shown as the clockwise transmission resonator in FIG. 1 (referred to clockwise resonator hereafter), the transmission directions of the lasers in the counterclockwise resonator and the clockwise resonator are opposite. Certainly, the laser may be transmitted clockwise in the first ring laser resonator, the laser may be transmitted counterclockwise in the second ring laser resonator, the present invention is not limited to one form. The detection section is provided with a sensing element 103 capable of causing an optical path difference. The common section is provided with an output unit or each of the reference section and the detection section is provided with the output unit. A first ring laser and a second ring laser output by the output unit are united by the light uniting unit, the two united lasers will generate the interference, and the frequency of the interference fringe is detected by a photoelectric detecting element.

In the above sensor, the pump light emitted by the pump source 101 enters the common section, and the gain medium 102 is stimulated to emit excited lights, the excited lights are transmitted oppositely in the clockwise resonant cavity and the counterclockwise resonant cavity, the physical quantity to be measured acts on the sensing element on the detection section and the optical length of the clockwise laser resonator is changed, such that the frequency of the laser in the clockwise laser resonator is changed, while the frequency of the laser in the counterclockwise laser resonator doesn't change, the lasers in the two resonators with different frequencies are output by the output unit and are united to generate the heterodyne interferometer, and the interference pattern is detected by the photoelectric detecting element to obtained the frequency difference between the two lasers, and the amount of the measured physical quantity may be determined according to the frequency difference. Specifically, in the clockwise resonator, the laser frequency is $$v_{CW} = q \frac{C}{L_{CW}},$$

in the counterclockwise resonator, the laser frequency is $$v_{CCW} = q \frac{C}{L_{CCW}},$$

where C is the speed of light, longitudinal modulus q is an integer, $L_{CW}$ and $L_{CCW}$ are the optical paths of the clockwise resonator and the counterclockwise resonator, CW and CCW respectively represent the clockwise direction and the counterclockwise direction. Because the optical path difference between the clockwise resonator and the counterclockwise resonator caused by the change of the optical path generated by the sensing element is $\Delta L = L_{CW} - L_{CCW}$. Therefore, in the formula $$\Delta v = \left(\frac{v}{L}\right)\Delta L = \frac{C}{\lambda L}\Delta L$$

for the frequency difference, L is the average of the optical paths of the clockwise resonator and the counterclockwise resonator, v is the average of the frequencies of the clockwise resonator and the counterclockwise resonator, λ is the wavelength of the laser. The speed of light C in the numerator of the formula is a large value, while λ in the denominator is a small value. Therefore when the optical path L has small change, the frequency difference Δv will have great changes. Therefore, the sensitivity and detection accuracy of the sensor are obviously higher than those of the traditional sensor (Mach-Zehnder interferometer and so on), and the clockwise resonator and the counterclockwise resonator of the sensor have common optical path, interferences of the common section from the external environment may be offset in the clockwise resonator and the counterclockwise resonator, such that the sensor has good anti-jamming capacity and is suitable for measuring the small changes in a variety of physical quantities.

Based on the above principle, the sensors with specific structure are provided in the follow.

First Embodiment

As shown in FIG. 1 the reference section and the detection section use the optical fiber as the transmission medium, a polarization-maintaining optical fiber is used for transmission. The reference section comprises a reference optical fiber 104, the detection section comprises a detection optical fiber 105, and the sensing element capable of causing an optical path difference is disposed on the detection optical fiber 105. The common section comprises a common optical fiber 106, the common optical fiber 106 is provided with a wavelength division multiplexer 107. The pump light emitted by the pump source 101 passes the wavelength division multiplexer 107 and enters the gain medium 102 in the common section. Two ends of the common optical fiber 106 may be connected to the detection optical fiber 105 and the reference optical fiber 104 through a first coupler 108 and a second coupler 109. Preferably, the first coupler 108 and the second coupler 109 are the couplers with higher splitting ratio, for example the coupler with the splitting ratio of 95:5, such that the clockwise laser passes the first coupler and enters the detection optical fiber 105, the counterclockwise laser passes the second coupler and enters the reference optical fiber 104, thereby avoiding the mutual interference of the two lasers affecting on the detection result. To further prevent certain laser from being disturbed by the reverse laser, each of the detection optical fiber 105 and the reference optical fiber 104 is provided with one isolator 110.

Figure 2:
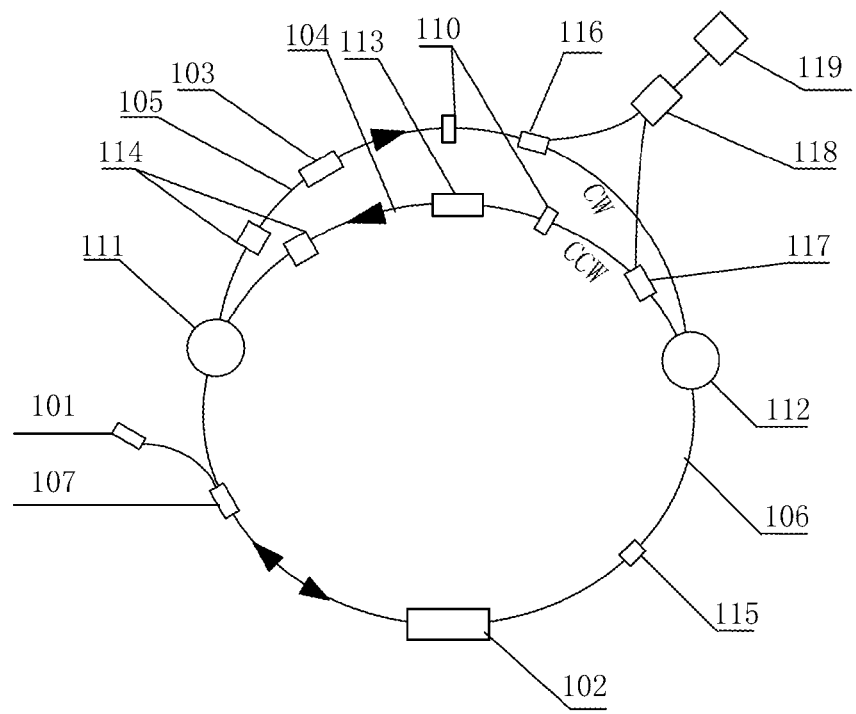
FIG. 2 is a second schematic structure view of the ring laser sensor according to the first embodiment of the present invention.

As another implementation, as shown in FIG. 2, the common optical fiber 106 may be connected to the detection optical fiber 105 and the reference optical fiber 104 through a first circulator 108 and a second circulator 109. The circulator is a multiport devices, the light in the circulator can only be transmitted along a single direction, while is isolated in the opposite direction.

In this embodiment, preferably, the lengths of the detection optical fiber 105 and the reference optical fiber 104 are equal, to make the initial optical path difference between the both approach zero, the initial optical path difference refers to the optical path difference between two paths under the situation that the physical quantity doesn't act on the sensing element 103, the ideal value is zero. To compensate the initial optical path difference, the reference optical fiber 104 may be provided with an optical fiber delay unit 113, to make the optical path difference as small as possible, to facilitate the detection of the photoelectric detection detecting element 119.

Furthermore, the laser will have a loss when transmitted in the resonator, in order to avoid the optical power difference between the clockwise resonator and the counterclockwise resonator being too large, each of the reference optical fiber 104 and the detection optical fiber 105 may be provided an adjustable attenuation unit 114, or can only the reference optical fiber 104 or the detection optical fiber 105 is provided with the adjustable attenuation unit. When the light intensity of one path is low, the laser intensity difference between the two path is reduced by adjusting the adjustable attenuation unit 114, to improve the measurement accuracy.

Furthermore, the common optical fiber 106 may be provided with a single frequency acquisition unit 115, or each of the reference optical fiber 104 and detection optical fiber 105 is provided with the single frequency acquisition unit 115, such that the clockwise resonator and counterclockwise resonator only transmit the laser with one frequency, thereby improving the interference fringe contrast. Further, the single frequency acquisition unit 115 may be narrow band filter, and may also be the unit formed by two collimated lenses and the F-P interferometer disposed between the two collimated lenses, the space between the two collimated lenses is a free space, the laser output by the optical fiber passes through the collimated lens and become parallel light, and the F-P interferometer select the frequencies of the light and enter the optical fiber after passing through another collimated lens.

In this embodiment, the output unit may be disposed on the common optical fiber 106, or each of the detection optical fiber 105 and the reference optical fiber 104 is provided with one output unit. As shown in FIGS. 1 and 2, the output units are disposed on the detection optical fiber 105 and the reference optical fiber 104, the output units specially comprises a third coupler 116 disposed on the optical fiber detection 105 and a fourth coupler 117 disposed on the reference optical fiber 104, the third coupler 116 and the fourth coupler 117 are connected to a light uniting unit 118 for uniting the light, the output port of the light uniting unit 118 is connected to the photoelectric detecting element 119. The detection optical fiber 105 and reference fiber 104 output lasers with different frequencies, the lasers respectively pass the third coupler 116 and the fourth coupler 117 and enter the light uniting unit 118 to be united, thereby resulting in the heterodyne interference, the interference pattern is detected by photoelectric detecting element 119, to obtain the frequency difference of the two lasers.

Figure 3:
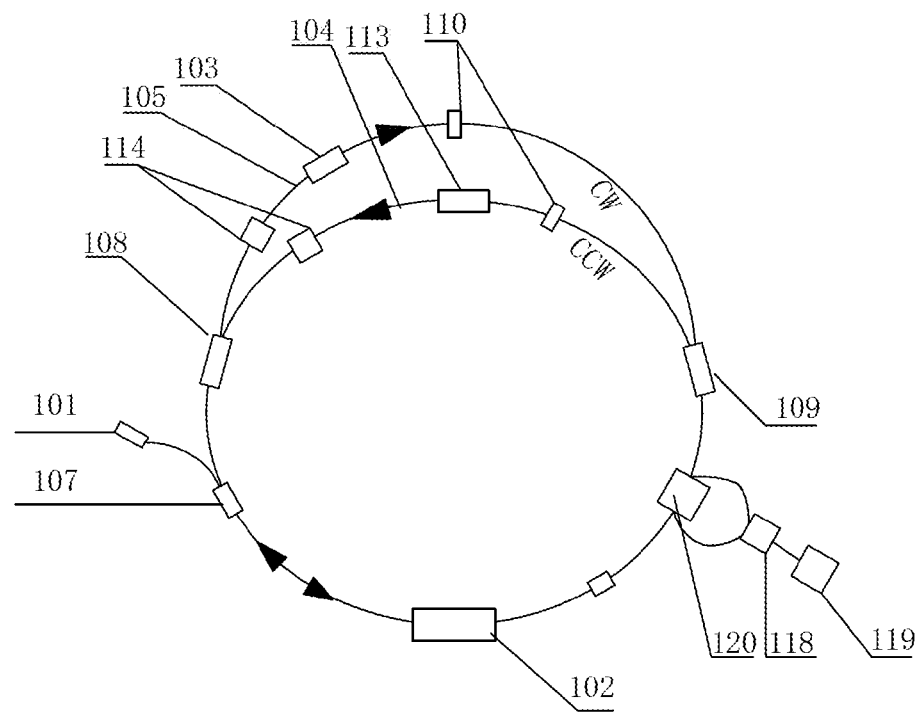
FIG. 3 is a third schematic structure view of the ring laser sensor according to the first embodiment of the present invention.

As shown in FIG. 3, the output unit may also be disposed on the common optical fiber 106, the output unit comprises a fifth coupler 120, the fifth coupler 120 have two output ports, the two output ports are connected to the light uniting unit 118 respectively through the optical fibers, and then connected to the photoelectric detecting element 119.

In this embodiment of the present invention, the gain medium 102 may be connected to a section of the common optical fiber 106 in the form of doped fiber, and may also be connected to the common optical fiber 106 in the form of single gain device. The number of the wavelength division multiplexer 107 and the pump source 101 may one or two, two wave division multiplexer 107 are respectively arranged between the gain medium 102 and the first coupler 108 and between the gain medium 102 and the second coupler 109, each wave division multiplexer is respectively connected to one pumping source. Such structure may improve the laser power.

In the embodiments of the present invention, the common optical fiber 106 is used as the common section of the two ring resonators, because all of the lasers in the clockwise resonator and the counterclockwise resonator pass such section, backscattering of the lasers are unavoidable during transmission, the backscattering laser inevitably joints the laser in the other optical path, such that the backscattering lights of the two lasers mutually couple into the counter-propagating laser in the common section, which will lead to decrease of the frequency difference of the two lasers, and lead to a more difficult detecting, and decreased sensitivity. Therefore, the length of the common optical fiber should not be too long, in order to reduce the coupling between two lasers, thereby avoiding the occurrence of a lock-in which is similar to a laser gyro.

Second Embodiment

Figure 4:
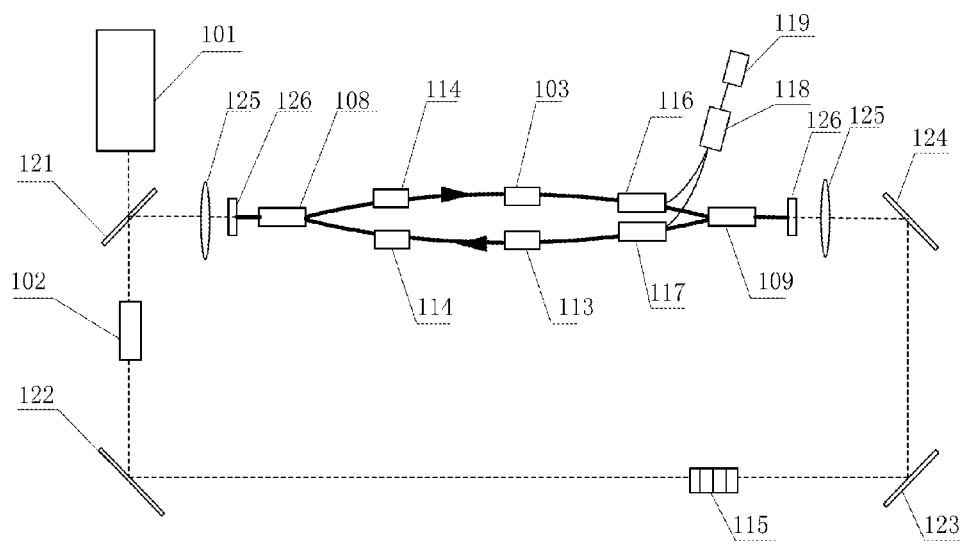
FIG. 4 is a first schematic structure view of the ring laser sensor according to the second embodiment of the present invention.

As shown in FIG. 4 this embodiment and the first embodiment are different in the arrangement of the common section. In the detection section and the reference section, the optical fiber is used for transmission, in the common section, the free space is used for transmission. Specially, the common section comprises a dichroic mirror 121 disposed on the output direction of the pump source, and a first reflector 122, a second reflector 123 and a third reflector 124 which form the free space optical path with the dichroic mirror 121. The gain medium is disposed in the free space optical path. The pump light emitted by the pump source 101 passes the dichroic minor 121 and enters the common section, the light having passed the dichroic mirror 121 enters the gain medium 102, and the gain medium 102 emits the excited light to both sides, two lasers are transmitted along the clockwise and the counterclockwise direction, specially are transmitted in the first ring laser resonator (counterclockwise resonator) formed by the common section and the reference section, and the second ring laser resonator (clockwise resonator) formed by the common section and the detection section, the laser is transmitted with opposite direction in the optical path formed by the dichroic mirror and the first reflector, the second reflector and the third reflector.

Furthermore, two ends of the common section is connected to the detection optical fiber 105 and the reference optical fiber 104 through the first circulator 108 and the second circulator 109, a lens group composing of a focusing lens 125 and a collimating lens 126 couples the lights at two ends of the common section into a section of optical fiber, and then the lights are coupled to the first coupler 108 or the second coupler 109 through the section of the optical fiber, and then transmit into the references optical fiber 104 and the detection optical fiber 105.

Referring to FIG. 4 further, as one embodiment, the output unit are disposed on the detection optical fiber 105 and the reference optical fiber 104, the output units specially comprises the third coupler 116 disposed on the optical fiber detection 105 and the fourth coupler 117 disposed on the reference optical fiber 104, the third coupler 116 and the fourth coupler 117 are connected to the light uniting unit 118 for uniting the light, the output port of the light uniting unit 118 is connected to the photoelectric detecting element 119. The detection optical fiber 105 and reference fiber 104 output lasers with different frequencies, the lasers respectively pass through the third coupler 116 and the fourth coupler 117 and transmit into the light uniting unit 118, thereby resulting in the heterodyne interference, the interference pattern is detected by photoelectric detecting element 119, to obtain the frequency difference of the two lasers.

Figure 5:
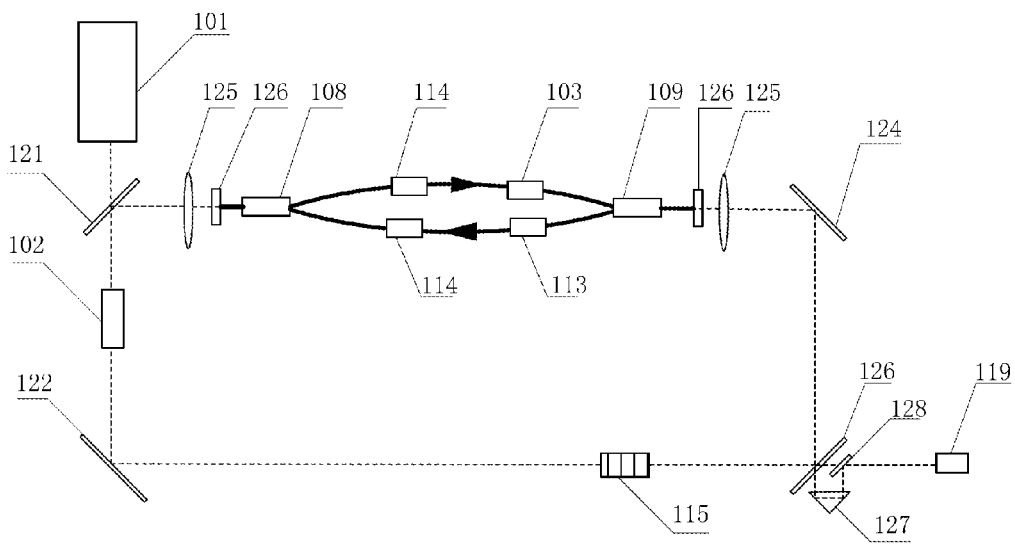
FIG. 5 is a second schematic structure view of the ring laser sensor according to the second embodiment of the present invention.

Referring to FIG. 5 further, as another embodiment, the output unit is disposed on the common section, and the second reflector 123 of the common section (or the third reflector 124 or fourth reflector 125) is replaced by an output mirror 126 having the functions of reflection and output, as a part of the output unit, the output mirror 126 is provided with a prism 127 in one output direction of the output mirror, the output mirror 126 is provided with a half-reflecting mirror 128 in another output direction of the output mirror, the clockwise transmitted laser is reflected to the half-reflecting mirror 128 by the prism 127, the counterclockwise transmitted laser is directly output to the half-reflecting mirror 128 by output mirror 126, the two lasers are united at the half-reflecting minor 128 and received by the photoelectric detecting element 119. Certainly, the position of the prism 127 and the half-reflecting mirror 128 may be exchanged.

In this embodiment, the same as the first embodiment, the single frequency acquisition unit, the optical fiber delay unit and the adjustable attenuation unit 17 etc. may be provided, of which the position and the function are the same as those in the above embodiment, here will not repeat them.

As other embodiments of the invention, a non-optical-fiber transmission may be used in the reference section and the detection section, such as free space transmission, the sensors arranged according to the above principle, namely forming two ring resonators by the common section, detection section and reference section, disposing the sensing element on the detection section, transmitting the two lasers oppositely in the two ring resonators to form the frequency difference, measuring the physical quantities by detecting the frequency difference, are within the protection scope of the present invention.

In conclusion, in the present invention, the common section and the detection section form the first laser resonator, and the common section and the reference form the second resonator, two lasers in the resonators are transmitted oppositely, the sensing element on the detection section changes the amount of the optical path of the resonator after acted upon by the physical quantity to be measured, thereby changing the frequency of the laser, to obtain the amount of the physical quantity to be measured by detecting the frequency difference of the two lasers. Because the frequency difference is sensitive to changes of the optical path, the sensitivity and the accuracy of the detection is higher, which can't be achieved by the traditional detection methods. Because the two resonators have common optical path, the detection has good stability, good anti-jamming capacity, and suitable for measuring small changes in a variety of physical quantities.

The foregoing descriptions are merely exemplary embodiment of the present invention, but are not intended to limit the present invention to it. Any modification, equivalent replacement, or improvement made without departing from the spirit and principle of the present invention shall fall within the protection scope of the present invention.

What is claimed is:

1. A frequency based ring laser sensor, comprising:
a pump source, a common section, and a reference section and a detection section which are connected to two ends of the common section in parallel,
the common section is provided with a gain medium, the common section and the reference section form a first ring laser resonator, and the common section and the detection section form a second ring laser resonator,
laser beams are transmitted oppositely in the first ring laser resonator and the second ring laser resonator,
the detection section is provided with a sensing element capable of causing an optical path difference;
the common section is provided with an output unit or each of the reference section and the detection section is provided with the output unit, the output unit is connected to a photoelectric detector through a light uniting unit, the laser beams are output from the output unit and are united and transmitted to the photoelectric detector.

2. The frequency based ring laser sensor according to claim 1, wherein the reference section comprises a reference optical fiber, the detection fiber comprises a detection optical fiber, and the sensing element capable of causing an optical path difference is disposed on the detection optical fiber.

3. The frequency based ring laser sensor according to claim 2, wherein the common section comprises a common optical fiber and a wavelength division multiplexer disposed on the common optical fiber, a pump light emitted by the pump source passes the wavelength division multiplexer and enters the common optical fiber.

4. The frequency based ring laser sensor according to claim 2, wherein the common section comprises a dichroic mirror disposed on the output direction of the pump source and a plurality of reflectors forming a free space optical path with the dichroic mirror, the gain medium is disposed on the ring optical path.

5. The frequency based ring laser sensor according to claim 1, wherein the reference section is provided with a delay unit.

6. The frequency based ring laser sensor according to claim 1, wherein the reference section and/or the detection section is provided with an adjustable attenuation unit.

7. The frequency based ring laser sensor according to claim 1, wherein the two ends of the common section are respectively connected to the reference section and the detection section through a first coupler and a second coupler.

8. The frequency based ring laser sensor according to claim 1, wherein the common section is provided with a single frequency acquisition unit.

9. The frequency based ring laser sensor according to claim 1, wherein each of the reference section and the detection section is provided with a single frequency acquisition unit.

10. The frequency based ring laser sensor according to claim 1, wherein each of the reference section and the detection section is provided with an isolator.

* * * * *